April 7, 1959
M. R. PORTER
2,880,825
HYDRODYNAMIC BRAKE
Filed March 22, 1955
2 Sheets-Sheet 1
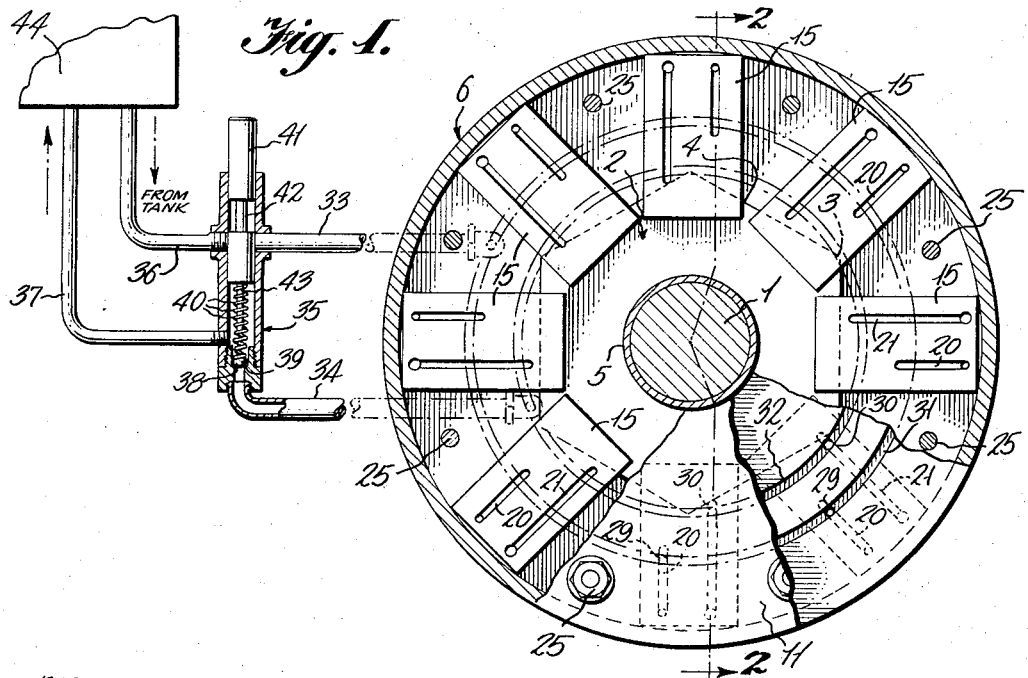
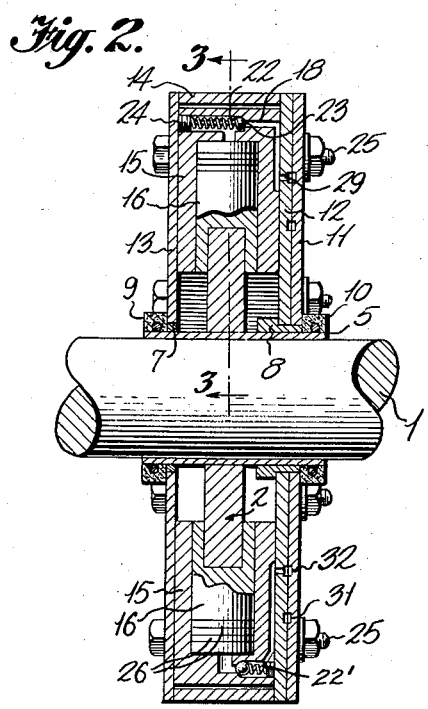
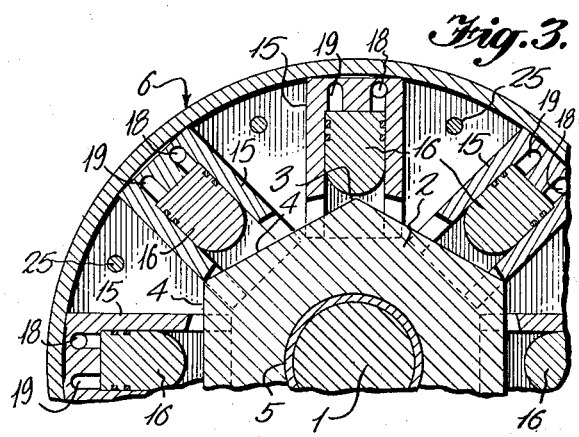
INVENTOR
*Mack R. Porter*
BY *Mason, Fenwick & Lawrence*
ATTORNEYS April 7, 1959  M. R. PORTER  2,880,825
HYDRODYNAMIC BRAKE Filed March 22, 1955  2 Sheets-Sheet 2

INVENTOR
Mack R. Porter
BY Mason, Fenwick & Lawrence
ATTORNEYS

United States Patent Office 2,880,825
Patented Apr. 7, 1959

2,880,825

HYDRODYNAMIC BRAKE

Mack Reid Porter, Marion, Va.

Application March 22, 1955, Serial No. 495,919

4 Claims. (Cl. 188—91)

This invention relates to fluid brakes, and particularly to brakes of this type which operate by means of a piston, or pistons, exerting a frictional retarding force upon a cam on the member to be controlled.

Brakes of the general character mentioned are known, and usually consist of a plurality of fluid-pressed pistons arranged radially around a cam mounted on the shaft to be braked. The pressure of the pistons on the cam retards its rotation and controls the shaft rotation.

Although such brakes are very effective, previous structures have had one serious drawback. The pistons remain in contact with the cam at all times, even when no braking is desired. This not only causes the braked member to do more work, but results in excessive wear on the brake parts. It has been proposed to move the cam out of the plane of the pistons when the brake is not applied but, while this prevents frictional drag, additional mechanism is required resulting in a more complicated structure.

The object of the present invention is to provide brake structure of this type wherein means are employed to hold the pistons out of contact with the cam except when braking is desired.

A more specific object is the provision of means in the fluid control system to accomplish this general purpose without adding to the structure of the brake itself.

A further object is to provide an improved fluid brake which is extremely simple and effective and will require practically no maintenance throughout its life.

Other objects of the invention will appear from the following description of one practical embodiment thereof, when taken in conjunction with the drawings which accompany, and form part of, this specification.

In the drawings:

Figure 1 is an elevational view of a brake embodying the principles of the present invention with the cover plates broken away to show the interior, and showing the fluid control system connected thereto;

Figure 2 is a vertical section at right angles to Figure 1, and is taken substantially on the line 2—2 of Figure 1;

Figure 3 is a partial medial vertical section taken on the line 3—3 of Figure 2, with the parts shown in release position;

Figure 4:
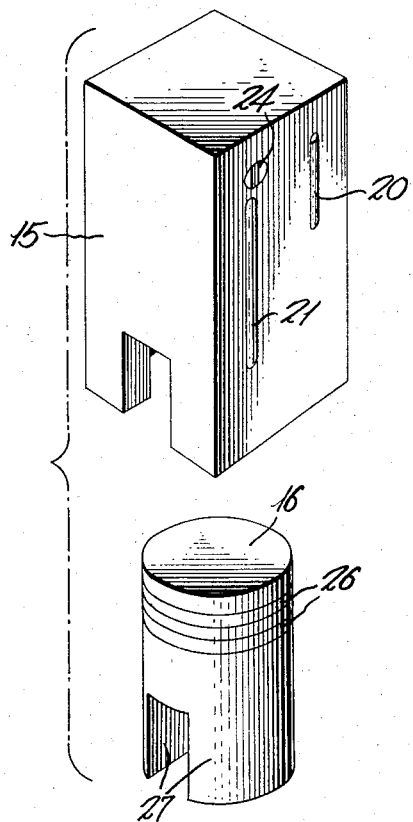
Figure 4 is a perspective view of one of the cylinder blocks and the piston which reciprocates therein.
Figure 5:
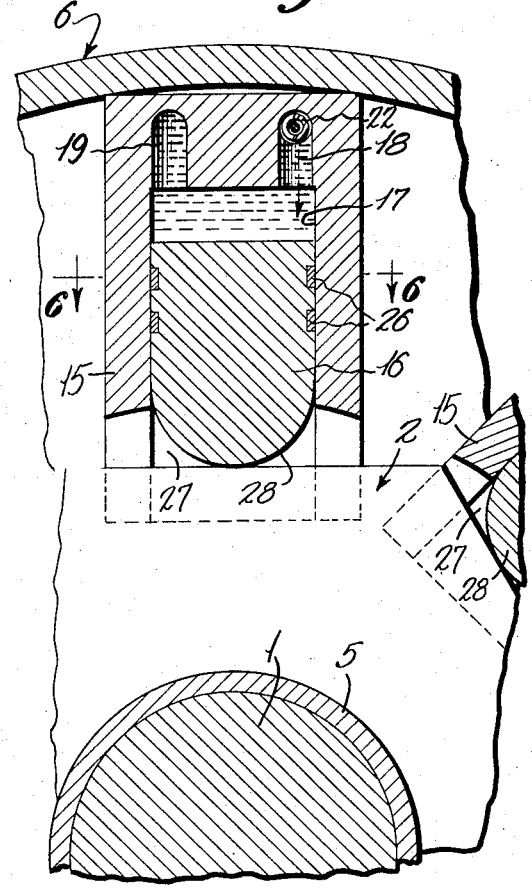
Figure 5 is an enlarged fragmentary view of a portion of the brake structure shown in Figure 3, with the parts in braking position; and, Figure 6 is a horizontal section through one of the cylinder blocks, taken on the line 6—6 of Figure 5.
Figure 6:
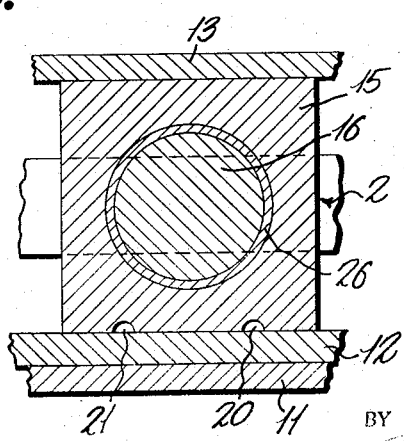

In general, the invention consists in a brake having a plurality of fluid-operated pistons arranged radially around a central cam mounted upon a shaft to be controlled. Fluid pressure upon the pistons causes them to bear upon the cam to retard its rotation. The fluid control system includes means to cause the pistons to be held out of contact with the cam when no braking is wanted, and means to automatically regulate the fluid exhaust pressure within the cylinders.

Referring to the drawings in detail, there is shown a shaft 1, which may be a vehicle axle, the drive shaft of a machine, or any shaft which is to be controlled by braking action. A cam 2 is fixed to the shaft. The cam is preferably polygonal in shape, but in any event it will have portions of its peripheral surface spaced different distances from the center of the shaft 1. In the present illustration the cam is hexagonal, having rises 3 and lows 4.

A sleeve 5 is fitted on the shaft 1 and the cam is fixed to the sleeve. The shaft, sleeve and cam rotate as a unit. The sleeve serves as one member of a bearing to mount the brake housing 6. Other bearing members 7 and 8 will be carried by the housing to permit free rotation of the shaft within the housing. Oil seals 9 and 10 will be used to seal the unit.

The housing is formed from the two matching side plates 11 and 12, placed side by side in surface contact, a third side plate 13, and an annular spacing rim 14 which holdes the plates 12 and 13 in spaced relation. Thus a hollow housing is formed about the cam and the shaft and cam are free to rotate in the housing. In use, the housing will be mounted so that it will be held against rotation.

A plurality of cylinder blocks 15 are radially positioned within the housing adjacent the rim. Eight blocks are shown, which is two more than the number of rises on the cam. By having more cylinders than rises, a fluctuating braking action is avoided and the action will be smooth. If the same number are employed, the pistons 16 will all be on the cam rises or lows at the same time giving an uneven braking. Blocks 15 are bored from the underside to form the piston chambers 17. The lower portions of the blocks are bifurcated to straddle the cam. The upper portions of the blocks are drilled, or cored, to form the fluid inlet and outlet passages 18 and 19, respectively. The passages extend to one side face of the block to communicate with vertical grooves 20 and 21. Inlet passage 18 extends completely through the block to admit a ball check valve and spring assembly 22. The ball seats upon valve seat 23 formed in the passage. A screw 24 holds the check valve assembly in place and closes the opening in the block wall. The blocks will be placed in position against the plate 12 and, when the rim and plate 13 are positioned, will be clamped in position by the bolts 25. These bolts also serve to hold the housing assembly together. A similar ball check valve assembly 22' is inserted in the outlet passage 19. This will prevent exhaust fluid from returning to the cylinders once it has been expelled.

The pistons 16 fit slidably within the chambers 17. The pistons are provided with the usual sealing rings 26 near their upper ends, and have their lower ends bifurcated to fit over the cam. The upper surface, between the depending legs 27 of the piston, is rounded, as at 28, for smooth sliding contact with the cam.

The grooves 20 and 21 in the face of the cylinder blocks, which communicate with the inlet and outlet passages, are also in communication with openings 29 and 30, respectively, in the plate 12. The openings 29 and 30, in turn, communicate with annular manifold grooves 31 and 32. The manifold grooves 31 and 32 may be formed in the face of the plate 12 or, as shown, may be formed in the meeting faces of the plates 11 and 12 so that when the two plates are together they form closed annular manifolds for the fluid. An inlet pipe 33 is tapped into the groove 31, and an outlet pipe 34 is tapped into the groove 32. Both of these pipes are connected to a control valve housing 35 and pipes 36 and 37 extend from the valves to a tank 44 containing fluid under pressure. Pipe 36 brings the fluid from the tank to the valve housing, and pipe 37 carries it from the valve housing to the tank.

Valve housing 35 is in the form of a cylinder which is closed at its lower end. A valve seat 38 is formed at the bottom and a ball check valve 39 seats upon it. This controls the flow of oil from the cylinders to the tank. Spring 40 urges the ball toward the seat. The upper end of the spring abuts the lower surface of a sliding valve member 41. The valve member has a close sliding fit within the valve casing and normally occupies a position closing the ends of pipes 33 and 36. The valve member has a portion of reduced diameter, shown at 42, which is normally located above the open ends of the pipes 33 and 36. When the sliding member is depressed, so that the portion of reduced diameter is in the area of the ends of the pipes 33 and 36, fluid will flow by pressure from the tank to the brake cylinders. Downward movement of the slide member will compress spring 40, increasing its pressure on the check valve so that more fluid pressure is required to lift the valve from its seat. Thus the pressure within the cylinders can be controlled as desired.

A rod 43 depends from the lower end of the valve sliding member within the spring 40. When the sliding member is depressed sufficiently, the end of rod 43 will rest upon the ball check 39 and lock the ball upon its seat. When the valve is in this position, the pistons will be forced downward in the cylinders into tight contact with the cam surface and locked in that position.

From the above it will be obvious that movement of the control valve will give very close control of the piston action, and therefore, permit the operator to obtain any degree of braking desired. When the valve sliding member is released so that it rises to its uppermost position, it will shut off communication between inlet pipes 33 and 36 so that no more fluid may flow from the tank. Continued rotation of the cam will force all of the pistons upwardly so that the fluid will be exhausted from the cylinders. As the inlet is closed, the pistons will be held in their uppermost position by vacuum created in the inlet line. Thus, when no braking is desired the pistons will be out of contact with the cam surface. By this arrangement there will be no drag on the cam except when the brakes are being applied. The cam and shaft, therefore, can run freely and, due to the fact that there is no contact between pistons and the cam, the life of the various elements will be considerably lengthened.

While in the above one practical embodiment of the invention has been disclosed, it will be understood that the details of structure described and shown are merely by way of illustration and the invention may take other forms within the scope of the appended claims.

What is claimed is:

1. In a control system for fluid brakes of the type having a plurality of pistons in cylinders radially positioned about a central cam, with the pistons radially movable for contact with said cam, a source of fluid under pressure, an intake maifold having communication to each of said cylinders, a check valve in the intake to each cylinder, an outlet manifold having communication to each of said cylinders, a check valve in the outlet from each cylinder, an inlet pipe line connecting said source of supply and said intake maifold, an outlet pipe line connecting said outlet manifold to said source of supply, a check valve in said outlet pipe line, a control valve having an open and closed position in said inlet pipe line, means to vary the opening resistance of said check valve in said outlet line, and means to lock the check valve in said outlet line in closed position.

2. In a control system for fluid brakes of the type having a plurality of pistons in cylinders radially positioned about a central cam, with the pistons radially movable for contact with said cam, a source of supply of fluid under pressure, an intake manifold having communication to each of said cylinders, a check valve in the intake to each cylinder, an outlet manifold having communication to each of said cylinders, a check valve in the outlet from each cylinder, an inlet pipe line connecting said source of supply and said intake manifold, an outlet pipe line connecting said outlet manifold to said source of supply, a check valve in said outlet pipe line, a control valve having an open and closed position in said inlet pipe line, and means carried by said control valve and operable therewith to vary the opening resistance of said check valve in said outlet line.

3. In a control system for fluid brakes of the type having a plurality of pistons in cylinders radially positioned about a central cam, with the pistons radially movable for contact with said cam, a source of supply of fluid under pressure, an intake manifold having communication to each of said cylinders, a check valve in the intake to each cylinder, an outlet manifold having communication to each of said cylinders, a check valve in the outlet from each cylinder, an inlet pipe line connecting said source of supply and said intake manifold, an outlet pipe line connecting said outlet manifold to said source of supply, a check valve in said outlet pipe line, a control valve having an open and closed position in said inlet pipe line, means carried by said control valve and operable therewith to vary the opening resistance of said check valve in said outlet line, and means carried by said control valve and operable when said control valve is moved to closed position to lock said check valve in said outlet line in closed position.

4. In a control system for fluid brakes of the type having a plurality of pistons in cylinders radially positioned about a central cam, with the pistons radially movable for contact with said cam, a source of supply of fluid under pressure, an intake manifold having communication to each of said cylinders, a check valve in the intake to each cylinder, an outlet manifold having communication to each of said cylinders, a check valve in the outlet from each cylinder, an inlet pipe line connecting said source of supply and said intake manifold, an outlet pipe line connecting said outlet manifold to said source of supply, a check valve in said outlet pipe line, a control valve having an open and closed position in said inlet pipe line, said control valve including a barrel having a valve plug slidable therein, said check valve in said outlet line including a ball and a spring, one end of said spring seated against said valve plug and the other end against the said ball, and an extension on said valve plug for contact with said ball to lock said ball against movement when said valve plug is in valve open position.

References Cited in the file of this patent

UNITED STATES PATENTS

| | | |
|---|---|---|
| 2,035,387 | Heritier | Mar. 24, 1936 |
| 2,232,252 | Mathey | Feb. 18, 1941 |
| 2,548,919 | Stevens et al. | Apr. 17, 1951 |
| 2,640,563 | Sanders | June 2, 1953 |

FOREIGN PATENTS

| | | |
|---|---|---|
| 447,849 | Great Britain | May 27, 1936 |